US008930683B1

(12) United States Patent
Spertus (10) Patent No.: US 8,930,683 B1
(45) Date of Patent: Jan. 6, 2015

(54) MEMORY ORDER TESTER FOR MULTI-THREADED PROGRAMS

(75) Inventor: Michael P. Spertus, Wilmette, IL (US)

(73) Assignee: Symantec Operating Corporation, Mountain View, CA (US)

( * ) Notice: Subject to any disclaimer, the term of this patent is extended or adjusted under 35 U.S.C. 154(b) by 659 days.

(21) Appl. No.: 12/132,039

(22) Filed: Jun. 3, 2008

(51) Int. Cl.
  *G06F 11/36* (2006.01)
(52) U.S. Cl.
  CPC .................................. *G06F 11/3668* (2013.01)
  USPC .......................................... 712/227
(58) Field of Classification Search
  CPC ................................................... G06F 11/3668
  See application file for complete search history.

(56) References Cited

U.S. PATENT DOCUMENTS

| | | | | |
|---|---|---|---|---|
| 5,335,344 | A | 8/1994 | Hastings | 714/35 |
| 7,174,554 | B2* | 2/2007 | Pierce et al. | 718/107 |
| 7,673,181 | B1* | 3/2010 | Lindo et al. | 714/38 |
| 2005/0177775 | A1* | 8/2005 | Qadeer et al. | 714/38 |
| 2006/0184771 | A1* | 8/2006 | Floyd et al. | 712/218 |
| 2007/0150248 | A1 | 6/2007 | Chiou | 703/13 |
| 2007/0226740 | A1* | 9/2007 | Li et al. | 718/102 |
| 2008/0271042 | A1* | 10/2008 | Musuvathi et al. | 718/108 |
| 2009/0235234 | A1* | 9/2009 | Biberstein et al. | 717/124 |
| 2009/0248689 | A1* | 10/2009 | Petersen et al. | 707/7 |

OTHER PUBLICATIONS

Matthew Chapman and Gernot Heiser. "Implementing Transparent Shared Memory on Clusters Using Virtual Machines" Apr. 2005 USENIX Annual Technical Conference, pp. 383-386.*
Hans J. Boehm, "Threads Cannot be Implemented as a Library," Internet Systems and Storage Laboratory, HP Laboratories, Palo Alto, California, HPL-2004-209, Internal Accession Date: Nov. 12, 2004, © Copyright Hewlett-Packard Company 2004, 10 pages.
Nicholas Nethercote and Julian Seward, "Valgrind: A Framework for Heavyweight Dynamic Binary Instrumentation," PLDI'07, Jun. 11-13, 2007, San Diego, California, Copyright © 2007 ACM 978-1-59593-633-2/07/0006. 12 pages.

* cited by examiner

*Primary Examiner* — Jacob A Petranek
(74) *Attorney, Agent, or Firm* — Campbell Stephenson LLP (57) ABSTRACT

One method of testing multi-threaded code involves accessing a first set of instructions which are configured to be executed, in execution order, as a thread of a multi-threaded process. A memory space is modified, based upon the first set of instructions. The modified memory space represents one or more values that are generated by executing the first set of program instructions in a different order than execution order. The memory space is processed by a second set of program instructions, which is configured to be executed as a second thread of the multi-threaded process.

17 Claims, 3 Drawing Sheets

MEMORY ORDER TESTER FOR MULTI-THREADED PROGRAMS

TECHNICAL FIELD

This invention relates to multi-threading and, more particularly, to testing multi-threaded programs for memory order errors.

BACKGROUND

Multi-threading involves supporting multiple threads of execution. The threads can execute simultaneously (e.g., in environments that provide multiple microprocessors and/or multiple processing cores per microprocessor) or in an interleaved fashion (e.g., in environments in which independent hardware is not available to execute each thread). Threads within the same multi-threaded program execute as part of the same process and share the same resources, including memory (i.e., the threads share the same address space).

Many popular programming languages, like C and C++, were designed prior to the rise in popularity of multi-threading. Accordingly, these languages do not feature built-in support for multi-threading. Instead, libraries have been developed to provide primitives that can be used to support multiple threads.

Applications written in languages that provide support for multiple threads of execution via library-based primitives are susceptible to certain types of memory ordering errors when operating according to a weak memory model. Weak memory models effectively allow different threads to each have a different view of the shared memory space. For example, a thread executing on one processor will access its own address space (e.g., provided in a memory that is associated with the processor on which that thread is executing). The thread's address space represents the shared memory (e.g., it is updated in response to the execution of other threads); however, at any point in time, the thread's address space may significantly differ from the address space used by another thread, despite the fact that the threads are technically sharing memory. For example, at time T1, one thread's address space may reflect that the value of variable A is 20, while another thread's address space may reflect that the value of variable A is 0, despite that fact that both threads are part of the same process. Each thread's address space evolves over time (e.g., as values are written to and read from that address space); however, with a weak memory model, there are few constraints on when the different addresses spaces evolve relative to each other.

As an example of a situation in which a memory order error can arise, one thread can include a first instruction that produces a value that is consumed by a second instruction in another thread, yet there may not be any restriction (either in the program or in the memory model) on when the first and second instructions execute relative to each other, and when the results of such execution will be reflected in the shared memory space, as seen by all threads. Accordingly, depending upon when the two instructions execute (or when the shared memory space, as viewed by each thread, is updated based upon the execution of those instructions), the value consumed by the second instruction may or may not depend upon the value produced by the first instruction. If the program's author intended for a dependency to exist, but the instructions can execute in an order that does not reflect that dependency (or vice versa), a memory order error may arise during execution. Memory ordering errors like this are often extremely difficult to detect, since different execution environments and/or compilers can lead to instructions executing (or appearing to execute, from the perspective of each thread) in different orders, such that the memory order error may only arise in certain situations. Accordingly, techniques that facilitate the detection of memory order errors in such environments are desirable.

SUMMARY OF THE INVENTION

Various techniques for testing multi-threaded code for memory order errors are disclosed. One method of testing multi-threaded code involves accessing a first set of program instructions. The program instructions in the first set are configured to be executed, in execution order, as a thread of a multi-threaded process. The method then modifies a memory space, based upon the first set of instructions. The modified memory space represents one or more values that are generated by executing the first set of program instructions in a different order than the execution order. The memory space is processed by a second set of program instructions, which is configured to be executed as a second thread of the multi-threaded process. Based upon the second set of program instructions and the modified memory snapshot (and particularly whether allowing the second set of instructions to process the values in the modified memory space causes any memory order errors), memory order errors within the multi-threaded code can be detected.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

A memory order tester tests multi-threaded code by first modifying a memory space, such that at a particular point in time the modified memory space represents results that would be generated if the program instructions in a particular thread (or multiple such threads) were executed in an order other than their configured execution order. The modified memory space is processed (e.g., through simulation or execution) by one or more other threads. The memory order tester detects whether allowing the modified memory space to be processed by another thread within the multi-threaded code will result in memory order errors.

Throughout this disclosure, terms like "first" and "second" are used to identify specific threads, snapshots, and/or sets of instructions. These terms are simply used for clarity in order to differentiate between two similar items and are not meant to imply any other relationship (especially temporal) between the items. Thus, a first thread can execute at the same time as a second thread, and the second thread may even begin executing prior to execution of a first thread being initiated.

Figure 1A:
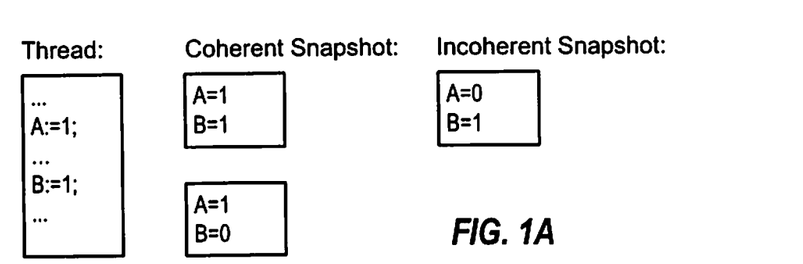
FIGS. 1A-1B illustrate examples of memory snapshots that can be generated to represent results generated by executing part of a thread in an order other than execution order, according to one embodiment of the invention.
Figure 1B:
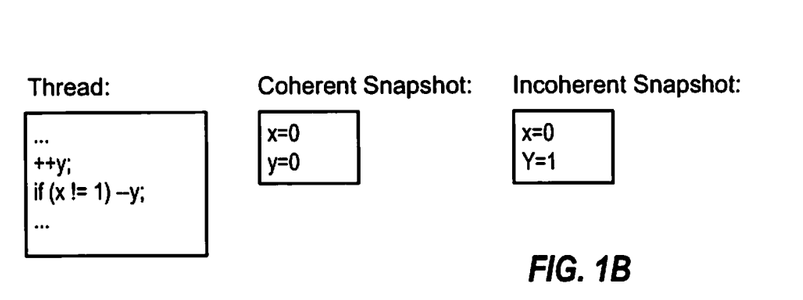

FIGS. 1A-1B illustrate examples of incoherent memory snapshots that represent results generated by executing instructions within a thread in an order other than execution order. These memory snapshots represent point-in-time snapshots of an incoherent memory space that can be generated by a memory order tester like the one illustrated in FIG. 3. The memory snapshots illustrated in the figures represent the contents of a memory space (e.g., a page or virtual page) at a particular point in time. A given memory snapshot can include significantly more information than is shown in these figures. Furthermore, a given thread may contain significantly more instructions than are shown in these examples.

FIG. 1A shows a thread that contains two instructions. The first instruction sets variable A equal to one (1), and the second instruction sets variable B equal to one (1). Both variables have an initial value of zero (0) prior to execution of the two instructions in the thread. The configured execution order of the instructions in the thread of FIG. 1A is the order shown in the figure, such that the first instruction (which sets variable A to one) is configured to execute before the second instruction. The configured execution order can be the order of the instructions within a compiled executable, as determined by a compiler. Alternatively, the configured execution order can be the order of the instructions as set forth in the source code.

For the thread shown in FIG. 1A, a coherent memory snapshot representing the results of executing the two instructions in the thread will include information indicating that the current value of A is one and that the current value of B is one. The coherent memory snapshot represents a point-in-time snapshot of these values, as seen in the thread's address space.

A memory order tester determines a set of results that would be generated if the instructions in the thread were executed in a different order than their configured execution order. In general, the instructions are executed in a different order than the configured execution order if the instructions are reordered and/or if fewer than all of the instructions are executed. These incoherent results are applied to a memory space other than the thread's memory space. FIG. 1A illustrates a point-in-time snapshot (referred to as an incoherent snapshot) of such a memory space.

As shown in FIG. 1A, an incoherent memory snapshot indicates that the value of A is zero (0) while the value of B is one (1). This snapshot represents the results that would occur if the second instruction ("B: =1") were executed before the first instruction ("A: =1") and/or if the first instruction were not executed at all.

As the example of FIG. 1A shows, the instructions that are executed in a different order (e.g., by reordering and/or selectively executing the instructions) for purposes of generating the incoherent memory snapshot are the instructions that generate results and cause those results to be stored to a memory location. Accordingly, only these types of instructions are shown in these examples.

FIG. 1B illustrates another example of an incoherent memory snapshot that can be generated by a memory order tester. As shown, a thread includes two instructions. The first instruction ("++y") increments the value of variable y. The second instruction decrements the value of y, if the value of x is not equal to one (1). These instructions provide an example of a set of instructions that can be generated by an optimizing compiler when compiling source code. In particular, the compiler could transform an instruction "if (x==1)++y" (if x is equal to 1, increment y) into the two instructions shown in FIG. 1B.

Accordingly, if the initial values of x and y are zero (0), a coherent memory snapshot representing the results generated by this thread should indicate that y still equals zero (0) after execution of the instructions. In other words, if x does not equal one (1), y should not remain incremented (i.e., the first instruction will increment y, but since x does not equal one (1), the second instruction will decrement y. This result is also consistent with the original source code instruction.

To generate an incoherent memory snapshot, a memory order tester can reorder the two instructions and/or select to not execute one of the instructions. Here, the second instruction is not executed, so that y has a value of one (1) even though x has a value of zero (0). An alternative incoherent memory snapshot can indicate that y has a value of negative one (−1), as would arise if the second instruction was executed and the first instruction was not executed.

Figure 2:
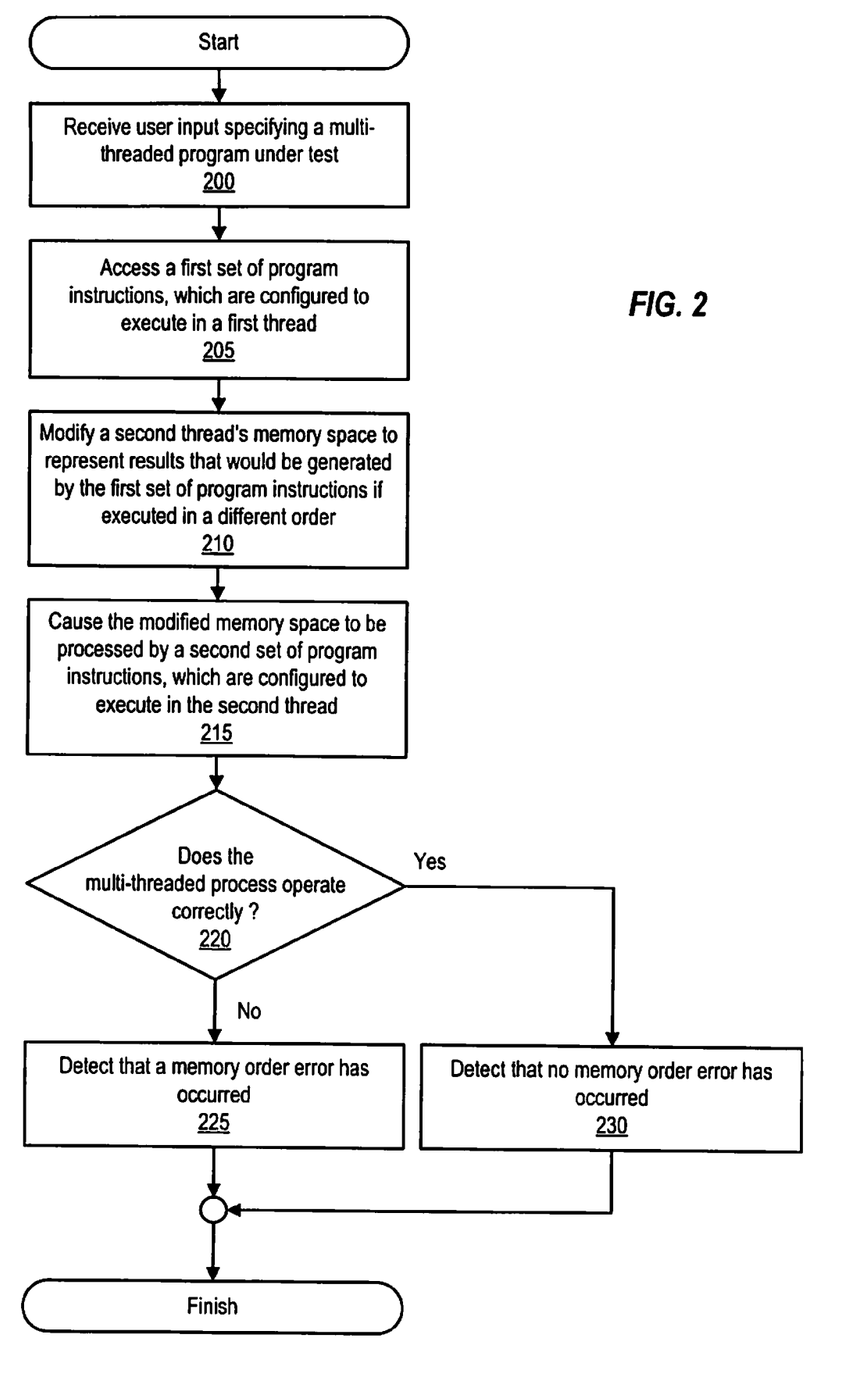
FIG. 2 is a flowchart of one embodiment of a method of testing multi-threaded code for memory order errors.

FIG. 2 is a flowchart of one embodiment of a method of debugging multi-threaded code. This method can be performed by a memory order tester such as memory order tester 350 of FIG. 3.

The method of FIG. 2 begins at 200, where user input specifying a multi-threaded program under test is received. The user input can specify the multi-threaded program under test by specifying a path name and/or file name that identifies the location of the program under test within a file system. The user input can be entered as text, a set of one or more user selections from a menu in a graphical user interface, or the like.

The specified program can include a variety of different types of information. For example, in one embodiment, the specified program may include one or more files, each containing source code. Alternatively, the specified program may include a compiled executable.

In addition to user input specifying the program under test, user input specifying when testing should begin can also be received (not shown). For example, if user input selecting a "Begin Test" option is received, it indicates that testing should begin immediately. In some embodiments, testing is delayed until such user input is received.

In some embodiments, a single memory order tester can implement more than one testing environment and/or methodology (examples of such environments and methodologies are described below). In such embodiments, user input specifying which environment and/or methodology to use can also be received (not shown). This user input is then used to configure the memory order tester, such that the testing will be performed using the selected methodologies. For example, if the memory order tester supports both instrumentation-based testing and write protection-based testing environments, user input can specify which type of testing environment to use.

At 205, the memory order tester accesses a first set of program instructions within the program under test. The instructions in this first set are configured to execute as a first thread of execution. Accessing the first set of program instructions can involve reading the instructions (e.g., from a persistent storage device) into memory and, in some embodiments, processing the instructions. For example, in some embodiments, accessing the first set of program instructions involves instrumenting the first set of program instructions such that, when executed, those instrumented instructions will modify another thread's memory space in an incoherent manner. Alternatively, accessing the first set of instructions can involve accessing one or more instructions within a particular thread in order to simulate execution of those instructions.

At 210, the memory order tester modifies a memory space in order to create an incoherent view (with respect to the first thread) of shared memory. This modified memory space is used by a thread (or multiple other threads) other than the first thread. The modified memory space is incoherent because the modified memory space (at some point in time during the testing process) represents results that would be generated by at least some of the first set of program instructions, if those instructions were executed in an order other than their configured execution order. This memory space can be modified in a variety of different ways, as described in more detail below.

The modified memory space produced by 210 is then processed by a second set of program instructions, which is configured to execute as a separate thread of execution (or several such sets of program instructions, each set being configured to execute as a separate thread), as shown at 215. The ways in which the memory space is processed can vary (e.g., based upon the technique used to modify the memory space). For example, if the modified memory space was created by simulating the first thread, the second thread can process the modified memory space via simulation as well.

It is noted that operations 210 and 215 can be performed at substantially the same time during memory order testing. For example, operation 210 can be repeated multiple times as the first thread is being simulated or executed. While operation 210 is being performed, operation 215 can also be performed, since simulation and/or execution of the second thread can be taking place at the same time as execution and simulation of the first thread (e.g., by switching back and forth between threads through the use of thread switching and/or by executing or simulating threads in parallel on independent cores or processors).

Furthermore, in many embodiments, the memory order tester can perform operations 210 and 215 for multiple different threads at the same time during testing. For example, the memory order tester can simulate and/or execute the first thread, based on the first thread's view of memory (referred to as the first thread's memory space), which is then used to modify a second memory space being processed by the second thread. While this is taking place, the memory order tester can cause the first thread's memory space to be modified based upon the memory order tester's execution or simulation of another thread. In other words, the first thread's own memory space can also be modified (e.g., according to operation 210) in an incoherent manner, based upon one or more other threads, at the same time as the first thread is being used to modify a memory space that will be (or is being) processed by other threads.

In some embodiments, as noted above, the first set of program instructions is instrumented by the memory order tester, creating an instrumented set of program instructions. In such embodiments, another thread's memory space can be modified by executing the instrumented set of program instructions. For example, the instrumented set of program instructions can include instructions that track the results generated by executing a portion of the first set of program instructions. After that portion of the first set of program instructions is executed, selected portions of the results identified by the instrumentation instructions can be applied to another thread's memory space (e.g., upon detection of a thread switch by the memory order tester), effectively delaying (from the other thread's perspective) certain instructions within the thread.

In one embodiment, instrumentation is done using software such as Purify™, available from IBM Corporation of Armonk, N.Y. The instrumentation software such as Purify™ can instrument a set of instructions by modifying existing instructions, rearranging existing instructions, and/or inserting new instructions into the set. Instrumentation using such software can also involve recalculating offsets (or similar information used to refer to different portions of the program under test), which may be changed by the instrumentation process, and updating other code (possibly including code outside of the particular set of instructions being instrumented) based upon those recalculated offsets or other information. The memory order tester can incorporate all or part of the functionality of Purify™ (or other appropriate instrumentation software). Alternatively, the memory order tester can be configured to interact with (e.g., via an application programming interface (API)) such software in order to invoke the appropriate functionality of the software on the portion of the program under test to be instrumented.

Similarly, another instrumentation technique can involve using a dynamic binary instrumentation (DBI) framework such as Valgrind, which is an open source DBI framework available for Linux. Valgrind produces shadow values, which are values that "shadow" all memory values generated by a program under test with information describing those memory values. The memory order tester can include (or be configured to interact with) a dynamic binary analysis tool that is based upon Valgrind or a similar DBI framework. The dynamic binary analysis tool is configured to dynamically instrument and simulate a portion of a program under test in order to create shadow values for each memory value generated by that portion of the program under test. Such shadow values can include the results generated by execution of certain instructions, information (e.g., timestamps) indicating when various results were generated relative to each other, and the like.

These shadow values can then be used by the memory order tester to modify another thread's memory space, based on the actual results generated by the thread (e.g., by applying some, but not all, of the results to the other thread's memory space, and/or by delaying application of selected ones, but not all, of the results to the other thread's memory space). For example, at a particular time (e.g., when a thread switch is detected), the shadow values can be used to select certain results to be applied to another thread's memory space and other results to be delayed or omitted from modifying the other thread's memory space, based upon when each result was generated (e.g., some earlier results can be omitted, such that preexisting values of the variable(s) included in the results are included in the incoherent memory snapshot). Alternatively, the dynamic binary analysis tool can be configured to generate shadow values that will themselves be applied to the other thread's memory space.

In other embodiments, instead of using instrumentation, execution of the first set of program instructions is simulated in a manner that causes operation 210 to be performed. For example, the memory order tester can access individual instructions within the thread and simulate the results that would be generated if the instructions executed in an order other than their configured execution order. Looking back at FIG. 1A, for example, the memory order tester could identify the two instructions that write values to memory, and then generate an incoherent memory snapshot representing results that would be generated if the second instruction executed before the first instruction and the first instruction had not yet been executed. Once the memory order tester has used simulation to generate an incoherent memory snapshot based upon instructions in one thread, the memory order tester can then simulate the execution of one or more other threads, based upon the values in the incoherent memory snapshot. The memory order tester can switch back and forth between threads, generating new incoherent snapshots each time.

In yet other embodiments, the memory order tester virtualizes the memory space for each thread, such that each thread explicitly sees a unique and independent virtual memory space (e.g., a different page of virtual memory can be assigned to each thread). In one embodiment, the memory virtualization is implemented by executing the program under test in a virtual non-uniform memory architecture (vNUMA), such that each thread sees an at least somewhat independent memory space.

When testing using virtualized memory space, the memory order tester can execute (or simulate execution of) instructions in a thread and cause that thread to store results in its associated virtual memory space. As a thread is being executed or simulated, the memory order tester can modify the results in a manner that reflects what would have happened if the instructions in the thread had executed in a different order (e.g., if some of the instructions had not been executed and/or if the order of the instructions had been rearranged), and store the modified results in another virtual memory space. The memory order tester can cause this other virtual memory space to be processed by another thread.

To effect this, the memory order tester can, for example, create the second virtual memory space on the fly (e.g., by applying some, but not all, of the first thread's writes to the second virtual memory space as those writes occur, while also delaying at least some of the first thread's writes from being applied to the second virtual memory space). When a thread switch from the first thread to a second thread is detected, the memory order tester can cause a memory manager to switch from pointing to the first virtual memory space (storing the results that are coherent with respect to the first thread) to the second virtual memory space (which is the modified memory space), such that the second thread will use the second virtual memory space during execution.

In other alternative embodiments, the other thread's memory space is modified by write-protecting all or part of the first thread's memory space. For example, in some embodiments, the first thread's memory space is write-protected, such that results generated by the thread cannot be written to the memory space without invoking a fault handler. The fault handler logs all of the writes and tracks the order in which they occurred, and ultimately applies those writes, in order, to the first thread's memory space. The memory order tester can access the information in the fault handler's log and use that information to modify another thread's memory space (e.g., by delaying some logged writes, applying writes in a different order than which those writes were logged, and the like)

In one embodiment, the memory order tester can include these fault handlers (e.g., for use if the memory order tester is simulating execution of the program under test). In other embodiments, these fault handlers are independent of the memory order tester. In those embodiments, the memory order tester can access the fault handlers log information via an API or other interface.

A determination as to whether the multi-threaded program is operating correctly can be made, as shown at 220. In particular, if the program operates correctly even when one or more thread is simulated or executed dependent upon the modified memory space generated at 210, no memory order error is detected, as shown at 230. If instead some of the threads generate incorrect results or otherwise perform in an undesirable manner, a potential memory order error is detected, as shown at 225.

In some embodiments, operation 220 may not be performed by the memory order tester; instead, a user (e.g., a person or other application) may independently analyze the results generated by the program under test during the testing process to make this determination. Performing this operation can involve comparing expected results or simulated results (e.g., generated by simulating or executing the program under test in a normal manner, without performing operation 210) to the results that are generated during the testing process (when operation 210 is performed). If differences are detected between the two sets of results, a potential memory order error can be detected.

The operations of FIG. 2 may, in some situations, be combined or reordered. For example, in some embodiments that generate the incoherent memory snapshot using a DBI framework, operations 210 and 215 may be significantly combined.

Additional operations can also be performed instead of and/or in addition to those shown in FIG. 2. For example, the memory order tester also save information identifying how another thread's memory space was modified, based upon the execution or simulation of the first thread. For example, the memory order tester can track which instructions were effectively delayed (e.g., by delaying application of results generated by those instructions to the other thread's memory space) by storing information identifying those instructions. Similarly, the memory order tester can track the relative order of certain instructions, based on when results written by those instructions were applied to another thread's memory space. The memory order tester can also track when certain results were applied to a thread's memory space (e.g., in response to performance of operation 210) relative to the order in which instructions within that thread read from the thread's memory space. If the order of certain instructions is effectively rearranged relative to the configured execution order, details of the rearrangement can be stored (e.g., indicating that one particular instruction was executed before another, in contrast to the configured execution order of those instructions). Information such as this can be used to pinpoint misbehaving code if a memory order error is detected.

Executing the program instructions or modified program instructions can be done in an environment (e.g., having multiple processors or multiple cores in each of one or more processors) that supports simultaneous threads of execution. In such environments, the memory order tester may be configured to control testing (e.g., through the insertion of instrumentation instructions) such that certain threads are occasionally paused or halted at a certain point (e.g., to allow the memory order tester to modify another thread's memory space based upon the results generated by the thread prior to being paused) and/or to delay execution of a certain set of instructions within a thread until the memory order tester has modified that thread's memory space according to operation 210.

Other environments may emulate an environment that supports multiple simultaneous threads of execution through the use of thread switches. For example, multiple threads can execute on a processor having a single core (or a simulated processor, such as that provided by a Valgrind-based dynamic binary analysis tool). At various points during the execution of a particular thread (some of which may be selected by the memory order tester and controlled using instrumentation), control can switch to another thread. As described above, in some such embodiments, the memory order tester can redirect a memory manager at each such thread switch, such that each thread processes a memory space that is incoherent with respect to at least one other thread.

In order to test multiple threads, the memory order tester may be configured to perform several tests, either in parallel or in series. For example, in one embodiment, the memory order tester is configured to perform operations 205 and 210 for all threads in the same test case.

In alternative embodiments, in a given test case, the memory order tester performs operations 205 and 210 for fewer than the total number of threads in the program under test. As an example, the memory order tester may only perform operations 205 and 210 for one thread per test case.

Figure 3:
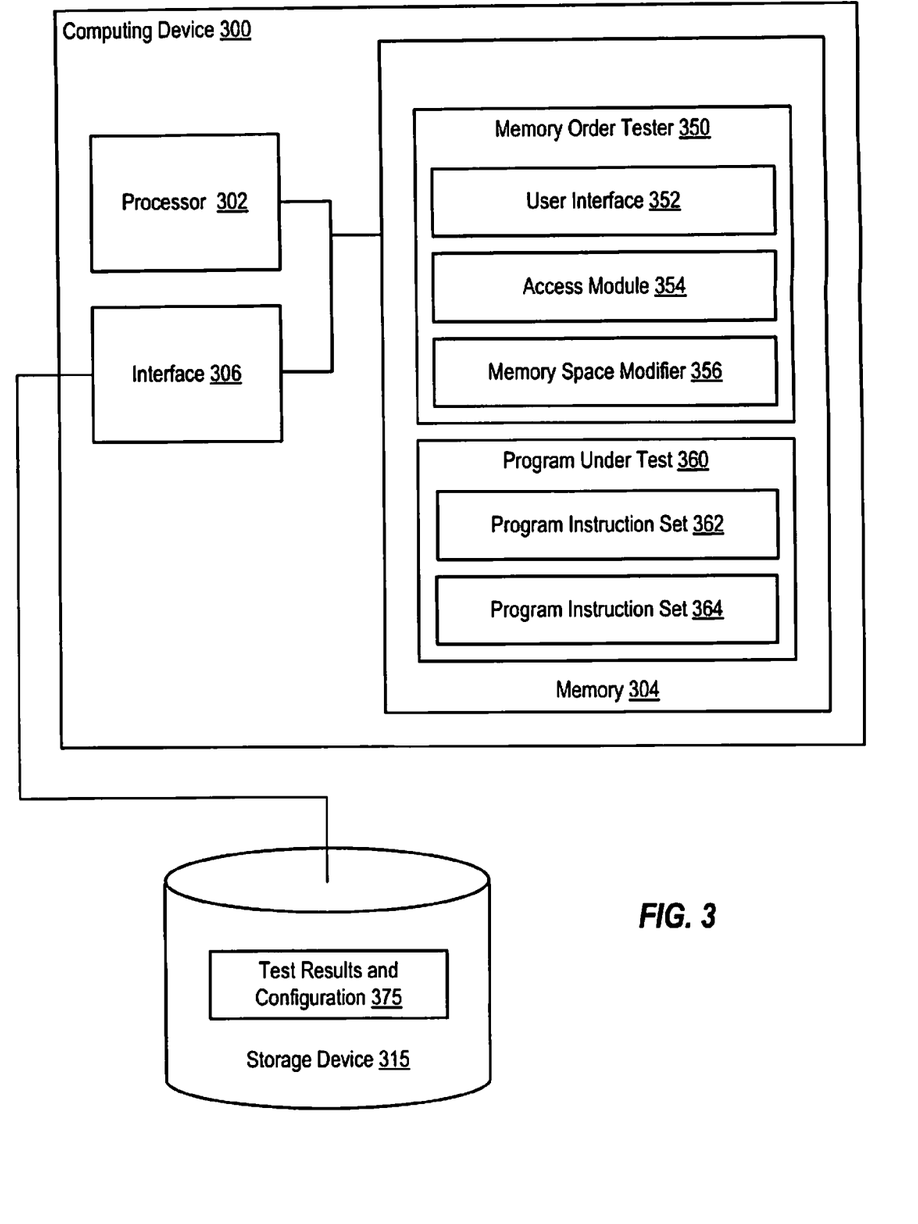
FIG. 3 illustrates how a memory order tester can be implemented in software, according to one embodiment of the invention.

FIG. 3 illustrates how a memory order tester can be implemented in software. FIG. 3 is a block diagram of a computing device 300. As illustrated, computing device 300 includes one or more processors 302 (e.g., microprocessors, PLDs (Programmable Logic Devices), or ASICs (Application Specific Integrated Circuits)) configured to execute program instructions stored in memory 304. Memory 304 can include various types of Random Access Memory (RAM), Read Only Memory (ROM), Flash memory, Micro Electro-Mechanical Systems (MEMS) memory, magnetic core memory, and the like. Memory 304 can include both volatile and non-volatile memory. Computing device 300 also includes one or more interfaces 306. Processor 302, interface 306, and memory 304 are coupled to send and receive data and control signals by a bus or other interconnect.

Interface 306 can include a network interface to various networks and/or interfaces to various peripheral buses. Interface 306 can also include an interface to one or more storage devices (e.g., storage device 315), user I/O devices (e.g., such as monitors or displays, keyboards, and the like), and the like.

In this example, program instructions and data executable to implement all or part of memory order tester 350, including user interface 352, access module 354, and snapshot generator 356, are stored in memory 304. In general, memory order tester 350 is configured to test a multi-threaded program, such as program under test 360, in a manner that reveals memory order errors within the program (such revealed errors can be detected by the memory order tester or by a user of the memory order tester). Program under test 360 includes a first program instruction set 362 and a second program instruction set 364. Each program instruction set includes instructions that are configured to execute in a single thread. Additional program instruction sets (not shown) can also be included in the program under test.

User interface 352 of memory order tester 350 can provide a command-line interface (CLI), application programming interface (API) (e.g., if memory order tester 350 is configured to provide add-on functionality to a preexisting testing application), and/or graphical user interface (GUI). User interface 352 is configured to provide an interface that allows a user (e.g., a person or application) to select a program under test, initiate testing, and/or configure testing (in embodiments in which multiple testing configurations and/or methodologies are provided). Information representing the user-selected configuration, if any, can be stored as part of test results and configuration 375 on a persistent storage media such as storage device 315. User interface 352 can also return test results (e.g., stored on a persistent storage media such as storage device 315) to the user (e.g., via a display device).

In response to user selection of a program under test and a user initiating testing of the selected program under test, access module 354 obtains a copy of the selected program. For example, access module can obtain a copy of all or part of program under test 360 from a storage device such as storage device 315 and load that copy into memory 304.

Memory space modifier 356 is configured to generate an incoherent view of shared memory space for at least one thread during the testing process. This incoherent view of shared memory space is stored in a memory space that is processed by one thread and is incoherent with respect to another thread. The incoherent view of shared memory space, at some point in time during performance of the test case, represents results that would be generated if the other thread were executed in an order other than its configured execution order. If the program under test is a compiled executable, the configured execution order can be the order generated by a compiler, for example, which may reorder certain instructions relative to the order in which those instructions appear in the original source code. Alternatively, if the program under test is contains source code, the configured execution order can be the order in which the instructions appear in the source code. Memory space modifier 356 can use a variety of different techniques, such as those described above, to modify one thread's memory space based upon another thread. It is noted that there may be significantly more than two threads in the program under test, and thus a single modified memory space can be processed by and/or modified based upon more than one other thread.

In one embodiment, memory order tester 350 performs testing by simulating execution of the program under test. For example, memory space modifier 356 and/or all or part of access module 354 can be implemented using a DBI framework, such that accessing the program under test involves dynamically instrumenting the program under test and modifying the memory space involves simulating execution of the instrumented program under test. In such an embodiment, memory space modifier 356 controls the simulation in a manner that will modify one thread's memory space in an incoherent manner, based upon the simulation of instructions in another thread.

In alternative embodiments, memory order tester 350 performs testing by monitoring execution of the program under test. The program being executed may be a modified (e.g., instrumented) version of the original program under test.

Memory space modifier 356 can store information identifying the order in which various instructions within the program under test effectively execute relative to each other (e.g., as part of test results and configuration 375). For example, memory space modifier 356 can delay applying a result generated by instruction 1 in thread 1 to thread 2's memory space, such that instruction 1's result is applied to thread 2's memory space subsequent to execution of instruction 2 in thread 2. In this situation, instruction 1 effectively executes after instruction 2. Memory space modifier 356 can store information identifying instructions as well as information (e.g., timestamps) indicating when those instructions were effectively executed relative to each other.

Memory space modifier 356 can, in some embodiments, interact with a memory manager in order to redirect the memory manager, access a memory fault handler's log, and/or write protect certain regions of memory space, as described above. Such functionality can be included in both embodiments that execute the program under test (or an instrumented version of the program under test) and embodiments that simulate execution of the program under test (or an instrumented version of the program under test).

Memory order tester 350 can also monitor the results generated by one or more of the threads (through either monitoring simulation or execution of those threads) when those threads are tested and store that information (e.g., as part of test results and configuration 375) for later use in analyzing the program under test. These results can also (or alternatively) be presented to a user, allowing the user to determine whether memory order errors have occurred. Alternatively, memory order tester 350 can compare the results generated during testing to known "good" results (e.g., as stored in a file and specified by user input received via user interface 352, or as determined by executing or simulating the program under test without using memory space modifier 356 to create incoherent views of the shared memory space). Based upon whether the results generated during testing match the known good results, memory order tester 350 can determine whether potential memory order errors have occurred.

The program instructions and data implementing memory order tester 350 can be stored on various computer readable storage media such as memory 304. In some embodiments, such software is stored on a computer readable storage medium such as a Compact Disc (CD), Digital Versatile Disc (DVD), hard disk, optical disk, tape device, floppy disk, and the like. In order to be executed by processor 302, the instructions and data implementing memory order tester 350 can be loaded into memory 304 from the other computer readable storage medium. The instructions and/or data implementing memory order tester 350 can also be transferred to computing device 300 for storage in memory 304 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   accessing a first thread of a multi-threaded program,
      wherein the first thread comprises a first set of program instructions, and
      wherein the first set of program instructions is configured to be executed in a program order of execution in the first thread;
   creating a modified execution order for the first set of program instructions,
      wherein the modified execution order is configured to execute the first set of program instructions out of the program order;
   modifying a memory space to produce a modified memory space,
      wherein the modified memory space comprises one or more values that result from executing the first set of program instructions according to the modified execution order;
   causing the modified memory space to be processed by a second thread of the multi-threaded program to produce a resulting memory space,
      wherein the second thread comprises a second set of program instructions configured to be executed in a second program order of execution in the second thread; and
   detecting whether a memory order error exists by comparing the resulting memory space with an expected resulting memory space,
      wherein the expected resulting memory space is produced by execution of the first set of program instructions in the program order and the second set of program instructions in the second program order.

2. The method of claim 1,
   wherein the accessing the first set of program instructions comprises instrumenting the first set of program instructions, and
   wherein the modifying the memory space comprises executing the instrumented first set of program instructions.

3. The method of claim 2, wherein the instrumenting the first set of program instructions comprises at least one of: modifying an existing instruction within the first set of program instructions and inserting a new instruction into the first set of program instructions.

4. The method of claim 1,
   wherein a first set of results generated by executing the first set of program instructions is stored in a first page of memory, and
   wherein the modifying the memory space comprises:
      modifying a second page of memory, based upon less than all of the first page of memory; and
      causing a memory manager to point to the second page of memory in response to a thread switch from the first thread to the second thread.

5. The method of claim 1,
   wherein the modifying the memory space comprises setting write-protection for a first page of memory,
   wherein results generated by executing the first set of program instructions are configured to be stored in the first page of memory, and
   wherein the modifying the memory space comprises selecting some of the results written to the first page of memory to be delayed before being written to a second page of memory.

6. The method of claim 1, further comprising:
   receiving user input specifying a program under test comprising the first set of program instructions and the second set of program instructions, wherein the accessing is performed in response to receipt of the user input.

7. The method of claim 1, further comprising:
   accessing the second set of program instructions;
   creating a second modified execution order for the second set of program instructions,
      wherein the second modified execution order is configured to execute the second set of program instructions out of the second program order;
   modifying a second memory space, wherein the modified second memory space comprises one or more values that result from executing the second set of program instructions according to the second modified execution order; and
   causing the modified second memory space to be processed by the first set of program instructions.

8. The method of claim 1, wherein
   the modifying the memory space is performed in an incoherent manner to produce the modified memory space, and
   the one or more values are applied to the memory space in the modified execution order.

9. A non-transitory computer readable storage medium comprising program instructions executable to:
   access a first thread of a multi-threaded program, wherein the first thread comprises a first set of program instructions, and
wherein the first set of program instructions is configured to be executed in a program order of execution in the first thread;
create a modified execution order for the first set of program instructions,
wherein the modified execution order is configured to execute the first set of program instructions out of the program order;
modify a memory space to produce a modified memory space,
wherein the modified memory space comprises one or more values that result from execution of the first set of program instructions according to the modified execution order;
cause the modified memory space to be processed by a second thread of the multi-threaded program to produce a resulting memory space,
wherein the second thread comprises a second set of program instructions configured to be executed in a second program order of execution in the second thread; and
detect whether a memory order error exists by comparison of the resulting memory space with an expected resulting memory space,
wherein the expected resulting memory space is produced by execution of the first set of program instructions in the program order and the second set of program instructions in the second program order.

10. The non-transitory computer readable storage medium of claim 9,
wherein accessing the first set of program instructions comprises instrumenting the first set of program instructions, and
wherein modifying the memory space comprises executing the instrumented first set of program instructions.

11. The non-transitory computer readable storage medium of claim 10, wherein the instrumenting the first set of program instructions comprises at least one of: modifying an existing instruction within the first set of program instructions and inserting a new instruction into the first set of program instructions.

12. The non-transitory computer readable storage medium of claim 9,
wherein a first set of results generated by executing the first set of program instructions is stored in a first page of memory, and
wherein modifying the memory space comprises:
modifying a second page of memory, based upon less than all of the first page of memory; and
causing a memory manager to point to the second page of memory in response to a thread switch from the first thread to the second thread.

13. The non-transitory computer readable storage medium of claim 9,
wherein modifying the memory space comprises setting write-protection for a first page of memory,
wherein results generated by executing the first set of program instructions are configured to be stored in the first page of memory, and
wherein the modifying the memory space comprises selecting some of the results written to the first page of memory to be delayed before being written to a second page of memory.

14. The non-transitory computer readable storage medium of claim 9, wherein the program instructions are further executable to:
receive user input specifying a program under test comprising the first set of program instructions and the second set of program instructions, wherein accessing the first set of program instructions is performed in response to receipt of the user input.

15. The non-transitory computer readable storage medium of claim 9, wherein the program instructions are further executable to:
access the second set of program instructions;
create a second modified execution order for the second set of program instructions,
wherein the second modified execution order is configured to execute the second set of program instructions out of the second program order;
modify a second memory space, wherein the modified second memory space comprises one or more values that result from execution of the second set of program instructions according to the second modified execution order; and
cause the modified second memory space to be processed by the first set of program instructions.

16. A system comprising:
a processor; and
a memory, wherein the memory stores program instructions executable by the processor to:
access a first thread of a multi-threaded program,
wherein the first thread comprises a first set of program instructions, and
wherein the first set of program instructions is configured to be executed in a program order of execution in the first thread;
create a modified execution order for the first set of program instructions,
wherein the modified execution order is configured to execute the first set of program instructions out of the program order;
modify a memory space to produce a modified memory space,
wherein the modified memory space comprises one or more values that result from execution of the first set of program instructions accordingly to the modified execution order; and
cause the modified memory space to be processed by a second thread of the multi-threaded program to produce a resulting memory space,
wherein the second thread comprises a second set of program instructions configured to be executed in a second program order of execution in the second thread; and
detect whether a memory order error exists by comparison of the resulting memory space with an expected resulting memory space, wherein
the expected resulting memory space is produced by execution of the first set of program instructions in the program order and the second set of program instructions in the second program order.

17. A system comprising:
means for accessing a first thread of a multi-threaded program,
wherein the first thread comprises a first set of program instructions, and
wherein the first set of program instructions is configured to be executed in a program order of execution in the first thread;

means for creating a modified execution order for the first set of program instructions,
   wherein the modified execution order is configured to execute the first set of program instructions out of the program order;
means for modifying a memory space to produce a modified memory space,
   wherein the modified memory space comprises one or more values that result from execution of the first set of program instructions according to the modified execution order; and
means for causing the modified memory space to be processed by a second thread of the multi-threaded program to produce a resulting memory space,
   wherein the second thread comprises a second set of program instructions configured to be executed in a second program order of execution in the second thread; and
means for detecting whether a memory order error exists by comparison of the resulting memory space with an expected resulting memory space, wherein
   the expected resulting memory space is produced by execution of the first set of program instructions in the program order and the second set of program instructions in the second program order.

* * * * *